(12) United States Patent
Xie et al.

(10) Patent No.: US 11,475,239 B2
(45) Date of Patent: Oct. 18, 2022

(54) SOLUTION TO END-TO-END FEATURE ENGINEERING AUTOMATION

(71) Applicant: PayPal, Inc., San Jose, CA (US)

(72) Inventors: Kai Xie, Singapore (SG); Chun Kiat Ho, Singapore (SG); Lin Song, Singapore (SG); Rey Neo, Singapore (SG); Edwin Boaz Soenaryo, Singapore (SG); Kim Dung Bui, Singapore (SG)

(73) Assignee: PAYPAL, INC., San Jose, CA (US)

( * ) Notice: Subject to any disclaimer, the term of this patent is extended or adjusted under 35 U.S.C. 154(b) by 477 days.

(21) Appl. No.: 16/691,294

(22) Filed: Nov. 21, 2019

(65) Prior Publication Data
US 2021/0158073 A1    May 27, 2021

(51) Int. Cl.
*G06K 9/62* (2022.01)
*G06N 20/00* (2019.01)

(52) U.S. Cl.
CPC ........... *G06K 9/623* (2013.01); *G06K 9/6257* (2013.01); *G06K 9/6264* (2013.01); *G06N 20/00* (2019.01)

(58) Field of Classification Search
CPC .... G06K 9/623; G06K 9/6257; G06K 9/6264; G06N 20/00
See application file for complete search history.

(56) References Cited

U.S. PATENT DOCUMENTS

| | | | | |
|---|---|---|---|---|
| 7,599,897 | B2* | 10/2009 | Hartman | G05B 13/048 706/45 |
| 8,190,537 | B1* | 5/2012 | Singh | G06N 20/00 706/12 |
| 9,070,041 | B2* | 6/2015 | Sato | G06K 9/6256 |
| 9,104,978 | B2* | 8/2015 | Zeine | G06N 20/00 |
| 10,217,052 | B2* | 2/2019 | Kuvshynov | G06K 9/00 |
| 10,346,757 | B2* | 7/2019 | Adams | G06N 20/00 |
| 10,454,958 | B2* | 10/2019 | Shabtai | H04L 63/1425 |
| 11,321,771 | B1* | 5/2022 | Horesh | G06Q 20/108 |
| 11,348,121 | B2* | 5/2022 | Albero | G06Q 30/0185 |
| 2013/0275349 | A1* | 10/2013 | Tashiro | G16B 25/10 706/12 |
| 2015/0127432 | A1* | 5/2015 | Miranda | G06Q 10/06395 705/7.41 |
| 2016/0110657 | A1* | 4/2016 | Gibiansky | G06N 20/00 706/12 |
| 2017/0344308 | A1* | 11/2017 | Murata | G06N 3/126 |
| 2019/0122136 | A1* | 4/2019 | Dirac | G06N 20/00 |
| 2019/0138946 | A1* | 5/2019 | Asher | G06N 5/04 |

(Continued)

*Primary Examiner* — Manav Seth
(74) *Attorney, Agent, or Firm* — Haynes and Boone, LLP

(57) ABSTRACT

Aspects of the present disclosure involve systems, methods, devices, and the like for an end-to-end solution to auto-identifying features. In one embodiment, a novel architecture is presented that enables the identification of optimal features and feature processes for use by a machine learning model. The novel architecture introduces a feature orchestrator for managing, routing, and retrieving the data and features associated with analytical job request. The novel architecture also introduces a feature store designed to identify, rank, and store the features and data used in the analysis. To aid in identifying the optimal features and feature processes, a training system may also be included in the solution which can perform some of the training and scoring of the features.

20 Claims, 6 Drawing Sheets

(56) References Cited

U.S. PATENT DOCUMENTS

| | | | | |
|---|---|---|---|---|
| 2019/0197361 A1* | 6/2019 | Rajendran | .............. | G06N 20/00 |
| 2019/0236460 A1* | 8/2019 | Jagota | .................... | G06N 5/025 |
| 2019/0236482 A1* | 8/2019 | Desjardins | ............... | G06N 3/00 |
| 2019/0310115 A1* | 10/2019 | Abe | ................... | G05B 13/0265 |
| 2020/0097850 A1* | 3/2020 | Bae | ........................ | G06N 20/20 |
| 2020/0210881 A1* | 7/2020 | Wu | ......................... | G06F 9/448 |
| 2021/0385432 A1* | 12/2021 | Park | ....................... | G06V 20/59 |
| 2022/0147849 A1* | 5/2022 | Chopra | .................. | G06N 5/045 |
| 2022/0167858 A1* | 6/2022 | Zuckerman-Stark | .... | A61B 5/02 |
| 2022/0172284 A1* | 6/2022 | Tarmann | .............. | G06Q 40/025 |

\* cited by examiner

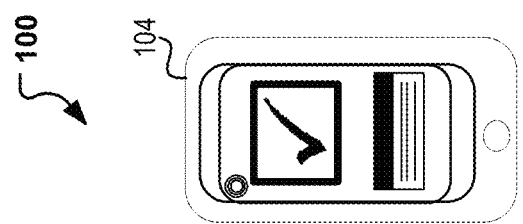
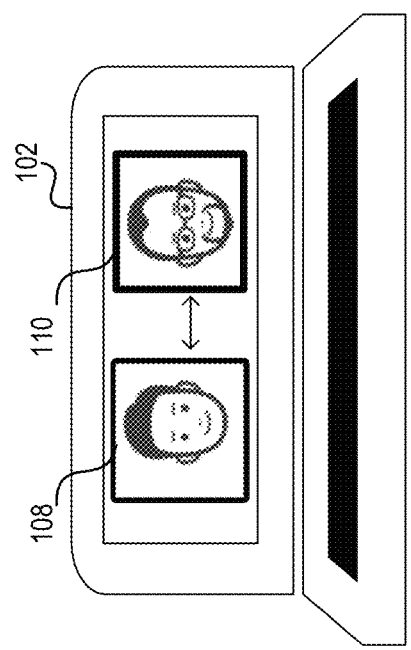
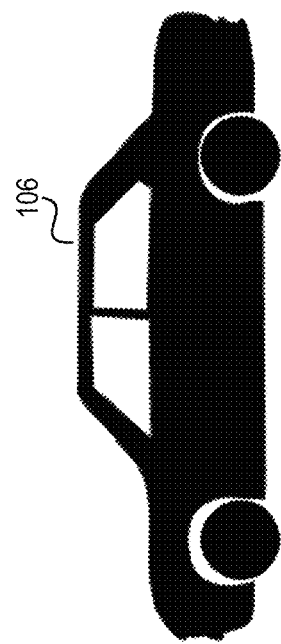
FIG. 1B
FIG. 1C
FIG. 1A

SOLUTION TO END-TO-END FEATURE ENGINEERING AUTOMATION

TECHNICAL FIELD

The present disclosure generally relates to data analytics, and more specifically, to a system design for improved feature selection used in performing data analytics

BACKGROUND

Nowadays with the proliferation of electronics, users are constantly relying on their electronics for access to social media, transacting, authenticating, messaging, etc. However, with such reliance comes the need for complex computations and big data analytics. As such, industry and academia have largely focused on the use of machine learning models for such computational analytics where statistical models can perform tasks without implicit instructions. The use of such machine learning models often requires training data to make predictions on a desired task. In some instances, the machine learning model may learn from test data by identifying commonalities. For learning and training the machine learning models, characteristics or features associated with the data are identified and used for pattern recognition and classification. Identifying the features for a model to use is cumbersome, time consuming, and often requires updating. Therefore, it would be beneficial to have a system and method for identifying features in a more reliable and dynamic manner.

BRIEF DESCRIPTION OF THE FIGURES

FIGS. 1A-1C illustrates exemplary applications of data analytics with machine learning.

Figure 2:
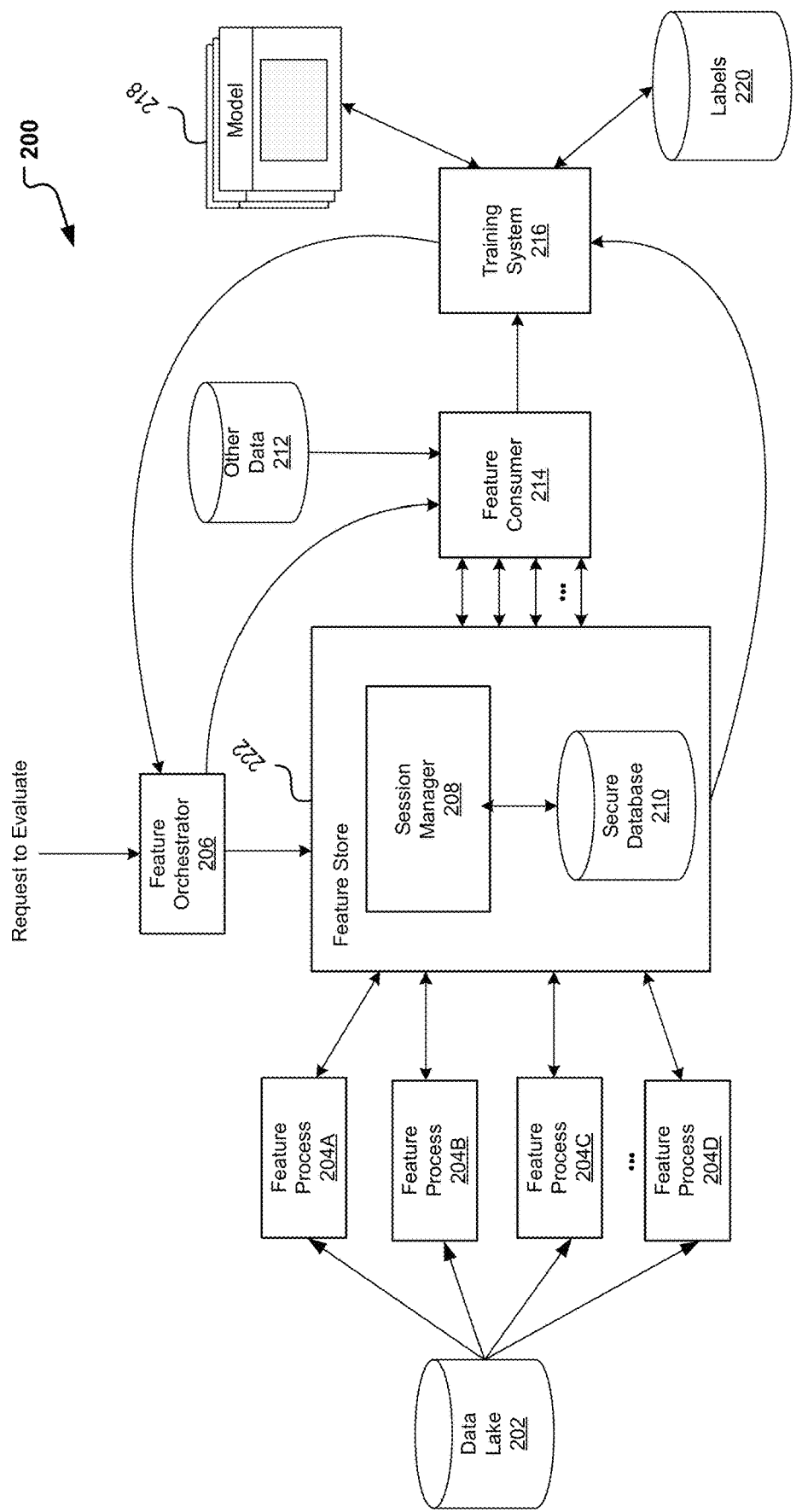
FIG. 2 illustrates a block diagram illustrating an exemplary architecture for end-to-end feature selection.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for an end-to-end solution to auto-identifying features. In one embodiment, a novel architecture is presented that enables the identification of optimal features and feature processes for use by a machine learning model. The novel architecture introduces a feature orchestrator for managing, routing, and retrieving the data and features associated with analytical job request. The novel architecture also introduces a feature store designed to identify, rank, and store the features and data used in the analysis. To aid in identifying the optimal features and feature processes, a training system may also be included in the solution which can perform some of the training and scoring of the features.

Nowadays with the proliferation of electronics, users are constantly relying on their electronics for accessing social media, transacting, authenticating, messaging, etc. However, with such reliance comes the need for complex computations and big data analytics. As such, industry and academia have largely focused on the use of machine learning models for such computational analytics where statistical models can perform tasks without implicit instructions. The use of such machine learning models often requires training data to make predictions on a desired task. In some instances, the machine learning model may learn from test data by identifying commonalities. For learning and training the machine learning models, characteristics or features associated with the data are identified and used for pattern recognition and classification. Identifying the features for a model to use is cumbersome, time consuming, and often requires updating. For example, in conventional machine learning model development, data scientists can spend up to 80% of their time manually preparing the raw data and processing it for features.

FIGS. 1A-1C illustrates exemplary applications of data analytics with machine learning. In particular, FIGS. 1A-1C provide exemplary instances where machine learning models are useful and feature selection is paramount. For example, turning first to FIG. 1A, a face recognition application is presented where machine learning may be used for identifying and verifying a user. The face recognition may occur on a device 102 designed to receive an image 110 and compare it with a retrieved image 108 of a user whose identity is being identified and verified.

The device 102 may be a tablet, iPad, cell phone or the like. For exemplary purposes, per device 102 can be a laptop. The device 102 may be used for web browsing, video streaming, bill payments, and online purchases. Additionally, the device 102 may be equipped with applications that enable the user to make purchases and transfers using payment provider applications and/or a digital wallet. Further, the device 102 may be capable of making phone calls and communicating with one or more other communications devices using a cellular network, Wi-Fi, Bluetooth, BLE, NFC, WLAN, etc. The communication can enable the transmission of information from a user account to a secondary source. In addition, the communication can enable the transmission of photographs, pictures, video, biometrics, and the like for user authentication. For example, the device 102 can be used to communicate with a user device. In the communication, the user may use a gallery and/or the camera in the personal device for taking, retrieving, or accessing an image of the user for use in authentication.

For the face identification, recognition and detection algorithms may be used which operate to compare facial features and make a decision based on the comparing. The recognition and detection algorithms may use machine learning models to aid in making the predictions and ultimately the decision as to whether a match exists, and a user is verified. For the machine learning models, facial features or facial dimensional vectors may be used to make the determination. Identifying the features to use and ultimately those to select may be a very tedious task and particularly tedious for facial features, as these vary widely between individuals. Therefore, a system and method that enable automated feature selection would be very beneficial.

Turning next to FIG. 1B, another exemplary application for machine learning is exemplified. As illustrated in FIG. 1B, a user device 104 is presented approving a transaction. Much like device 102, user device 104 may be a tablet, iPad, cell phone or the like. For exemplary purposes, user device 104 can be a smart phone. The user device 104 as illustrated may be used for web browsing, video streaming, bill payments, and online purchases. Additionally, the user device 102 may be equipped with applications that enable the user to make purchases and transfers using payment provider applications and/or a digital wallet. Further, the device 102 may be capable of making phone calls and communicating with one or more other communications devices using a cellular network, Wi-Fi, Bluetooth, BLE, NFC, WLAN, etc. The communication can enable the transmission of information from a user account to a secondary source. For example, as illustrated here the person device may be used to verify and approve a transaction.

Like the face recognition application, this type of verification can also use machine learning models for processing. For example, if a transaction amount is too large, the transaction is out of the ordinary, or a user is a high-risk user, then further data analytics may be performed before allowing the transaction to be approved. In the case with the large dollar amount, the user's transaction history may be reviewed, and other profile details considered and analyzed before the approval occurs. In the instance where the transaction is out of character or not customary for the user, data analytics and modeling may occur to check for fraudulent activity, account take over attacks, and stolen identity. Similarly, identifying a high-risk user may include other data analytics, and consequently machine learning models. Thus, approving a transaction may include more than a communication with merchant, or financial institution, but can also include machine learning models and corresponding features to be able to determine if a flag needs to be raised and transaction declined. However, to make such determination includes understand what features to use which best characterize the user as high-risk, a transaction as unique, or dollar amount as being too large. As such, it would be beneficial to determine what features to use in a quick and reliable manner.

Turning next to FIG. 1C, yet another exemplary application is presented which includes the use of data analytics and machine learning. As illustrated in FIG. 1C, an autonomous or semi-autonomous vehicle 106 is presented. The vehicle 106 may use sensors located around the vehicle 106 to collect data, geo-locational data, weather data, and the like to make decisions (using machine learning models) on road conditions, weather, vehicle 106 proximity to others, road hazards, etc. For example, the sensors (e.g., accelerometers, heat, light, temperature, cameras, etc.) may be used to detect road conditions, other objects in the vicinity, speed, etc. Global positioning systems and other geo-location data may be used to determine if a mountainous path is approaching, a steep road or a long bridge is enroute. Similarly, weather conditions may be accessed and driving decisions made (using machine learning models) based on whether it is raining, snowing, windy, or simply sunny outside. These and other factors play important roles in the vehicle's 106 navigation and as such large data is analyzed and as decisions are made adequate features need to be selected. Therefore, it would be beneficial to have a system and method for identifying features in a more reliable and dynamic manner.

To eliminate some of the manual work required to process the raw data and identify the features, industry has used a handful of tools that have been created to provide some of the automation. However, the projects using the tool generally support only partial automation and are able to perform only some of the feature engineering. For example, feature selection may be automated, but feature processing and creation still remain a manual task.

As such, FIG. 2 is introduced to illustrate a block diagram of an exemplary architecture for feature selection. In particular, in one embodiment, a complete solution is introduced which enables end-to-end feature engineering automation. Such feature engineering automation can enable automatic feature construction and processing that produces a best performance for a given model. Thus, the models may achieve the optimal performance for a given criteria (e.g., precision rate, record rate, accuracy rate, receiver operating characteristic (ROC) number, area under the curve (AUC) number, Gini coefficient, etc.)

A feature process has many ways of constructing and processing features from the data. Based on the use case, data scientists can use the data with different criteria to analyze different algorithms that may be used, to determine how the different algorithms are processing the data and affect model performance. Based on the analysis, it may be determined which way of processing will achieve the best model performance. Thus, FIG. 2 introduces an auto-determining feature system 200 and method that can aid in determining which processing method is best or optimal candidate for feature processing that should be used in production when compared with other processing methods.

For use of the architecture, a request to evaluate various feature constructions and/or feature algorithms may first be received by the feature orchestrator 206. As such, the feature orchestrator 206 may receive request to evaluate and/or to provide a job status. The feature orchestrator 206 may be designed to orchestrate different tasks and components. Thus, in one embodiment, the feature orchestrator 206 is designed to compare different feature processes' impact on a machine learning model(s) based on some given data that may be received from the request and/or retrieved from a database (e.g., data lake 202), server, cloud, etc. In one instance, the request may include the one or more feature processes 204A-204D to evaluate. In another instance, the request may include predefined feature constructions and processing algorithms that may be used to generate the feature processes 204. Still in another instance, the feature orchestrator 206 may provide recommendations on the feature processes 204 to use based on historical data acquired, optimal feature processes identified, metadata from the input data, and/or from the machine learning model. Thus, one or more (thousands) of feature processes may be used in the regression analysis. Once the feature processes 204 and data is obtained, the feature orchestrator 206 may begin the analytical session by communicating with the feature store 222 to initiate the evaluation. Note that specific details on how the feature orchestrator functions is described in more detail below and in conjunction with FIG. 3.

At the feature store 222, an analytical session identification number (ID) may be created which may be used by the feature orchestrator 206 for identifying the feature processes 204 to be used in the analysis. In one embodiment, the one or more of the feature processes 204A-204D may be identified and analytical session ID injected for identification during the analysis. In some embodiments, the feature processes 204 may be deployed in a containerized environment (e.g., Hadoop, MapReduce, Kubernetes, etc.). Thus, those feature processes selected may retrieve some of the data from the data lake 202 (e.g., in a distributed file system). Once the data is retrieved, it may be input into the selected feature processes 204 and output as features with the analytical session ID to be written to the feature store 222. Each of the feature processes 204 run may produce distinct features and/or similar features but of different versions. The feature processes may run in parallel and/or in serially. Additionally, the feature processes 204 for one request may run at the same time as another request/job is being processed. Within the feature store 222, a session manager 208 and secure database 210 may also exist which can help in the writing, managing, and storing of the features. In one embodiment, the session manager 208 may aid in generating the analytical session IDs. In another embodiment, the session manager 208 may aid in routing the write request into the corresponding partition within the secure database 210. In yet another embodiment, further to the storage and routing of the information, the feature store 222 is also able to isolate features from other sessions. That is to say, only those features associated with a current session are visible and not accessible from another session. Still in other embodiments, the feature store 222 provides the ability to promote or retire features such that those not promoted may be deleted over time. Those promoted may then be used in live analytical sessions and used in future analysis more broadly and available for selection as other request are received. Note that further details on the functionality of the feature store 222 are included below and in conjunction with FIG. 4.

Once the features have been identified and stored, the feature consumer 214 who also received the analytical session IDs may then bidirectionally communicate with the feature store 222 for retrieving the features identified. Therefore, the feature consumer 214 can use the analytical session IDs to pull the features from the feature store 222 and then transmit those the training system 216. In addition, the feature consumer 214 may be used to access other data associated with the analytics involved (e.g., transaction ID) and then link the feature dimension with the other data 212 for training and accessing the labels 220 used in the model(s) 218.

After the features and other data 212 have been linked, these can be batched and transmitted to the training system 216 which can use this in conjunction with external (or internal) labels and models to determine which of the features input are the optimal. The identification of the optimal features may then be sent to the feature orchestrator 206 for use and making recommendations as other feature process request are received. To identify the optimal features to use a feature selection score may be determined and used in the identification. Note that other techniques may be used, and a feature selection score is, but an exemplary technique presented. Further to the feature selection score, a ranking strategy or other method may be applied to select those features with the higher or targeted scores. Additionally or alternatively, the feature orchestrator 206 and/or the request can include the ranking strategy (e.g. sorting, normalization and weighting, Eucledian distance) to be used and/or features from which to select, which in turn provide an output indicating the best feature processes to use. As the features and corresponding feature processes 204 are identified, the end-to-end auto-determining feature system may be re-processed (or as another request comes in of a same type) features re-analyzed until the model performance converges.

Figure 3:
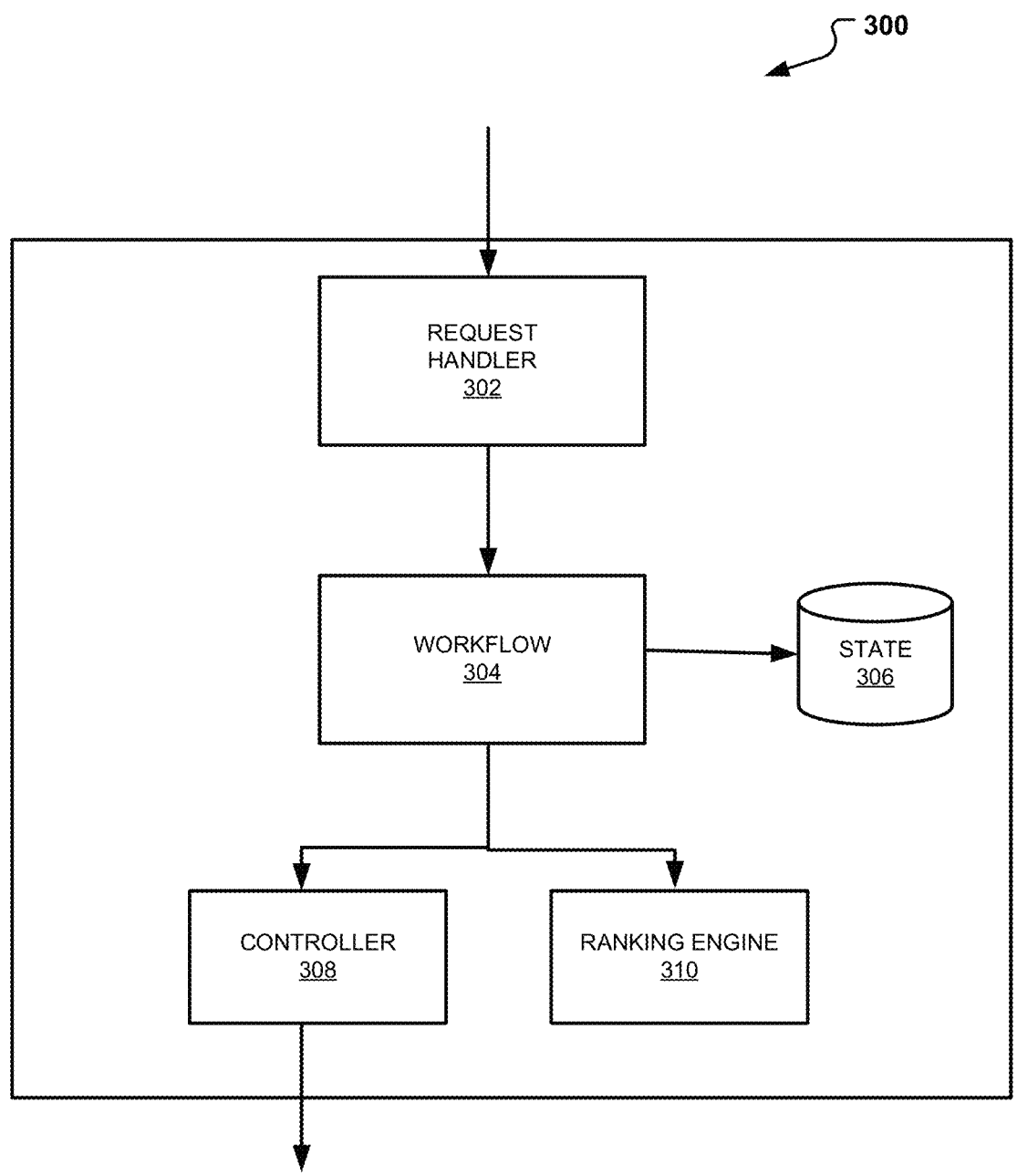
FIG. 3 illustrates exemplary block diagram of a feature orchestrator used for feature selection.

Turning next to FIG. 3, an exemplary block diagram of a feature engineering orchestrator 300 used for feature selection is presented. As previously indicated, the feature engineering orchestrator 300 (e.g. previously feature orchestrator 206) is a module design to orchestrate different tasks and components. In addition, the feature engineering orchestrator 300 is designed to communicate with the feature store 222 to begin the feature process analysis and analytic session ID designation. To further understand how the communication, orchestration, and designation occurs, consider at FIG. 3, the receipt of the processing request at a request handler 302. As the name indicates, this module handles the incoming request. Thus, the request handler 302, may receive the request and begin the processing. The receipt request may derive from a platform on a device 102, an application on a user device 104, or other communication device capable of transmitting and communicating a feature process evaluation request for receipt and processing at the feature auto-determining system 200. For processing, the request handler 302 may perform some initial clean up and validation to prepare the data for receipt by the work flow module 304.

The work flow module 304 functions as a state flow pipeline which may be used for data management and recovery for in instances where, for example, the request handler 302 or event feature engineering orchestrator 300 is being restarted. The work flow module 304 may also be used for data recovery when the feature engineering orchestrator 300 goes down. The work flow module 304 may also perform multiple tasks sequentially or in parallel and can communicate with a state store 306 for aiding in scheduling. The work flow module 304 may further communicate with a controller 308. The controller 308 may operate like a job submitter and help submit those jobs for feature process evaluation so that the requests may be run in parallel. In addition, the controller 308 may submit those jobs to the feature consumer 214, so that the feature consumer 214 may start consuming and processing the data. The controller 308 can still further help submit jobs to the training system 216 for determining and designating those features which are the best among those in the job request and even training jobs. Once the jobs are submitted, the controller 308 can help carry the job state and the status and can be reported to the requestor. As features and jobs are being processed, ranking strategies may be used to determine which features to select for training and later as optimal. The ranking strategies may be stored and should be used and executed by the ranking engine 310.

Note that while several of the functions performed by the feature engineering orchestrator 300 and modules involved for performing the functions, other functions and modules may exists. The diagram is used for exemplary purposes and is not limited by those functions defined. For example, in addition to the ranking engine 310, threshold or feature score modules may also exist to aid in the score computation.

Figure 4:
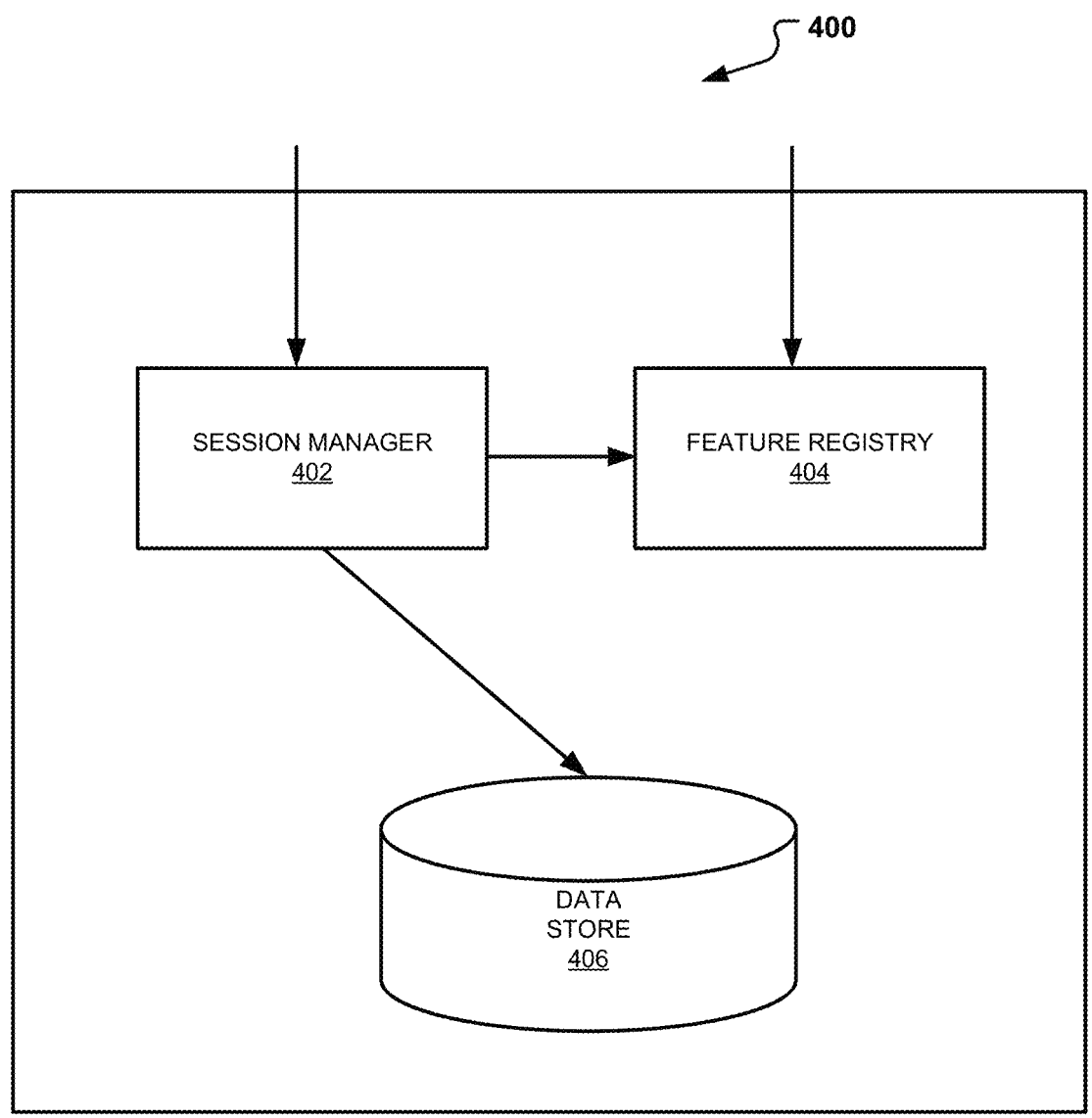
FIG. 4 illustrates exemplary block diagram of a feature store used for feature selection

Turning next to FIG. 4, illustrates exemplary block diagram of a feature store 400 used for feature optimization and selection. In particular, FIG. 4 illustrates the feature store 222 (now feature store 400) described above and in conjunction with FIG. 2, is illustrated here with greater detail. Again, at the feature store 400 an analytical session identification number (ID) may be created which may be used by the feature engineering orchestrator 300 for identifying the feature processes 204 to be used in the analysis. Within the feature store 400, a session manager 402 may exist. The session manager 402 may be used for allocating the unique analytic session IDs mentioned, so that isolation may exists between different jobs/experimental sessions. A feature registry service module 404 may also exist within the feature store 400. The feature registry module 404 may be used to register the features available on a physical store or data store 406. Requests may be received and the data store 406 accessed for the retrieval of feature versions in use in future data analysis. The feature registry service 404 and data store 406 may also be used in retiring and promoting features. As indicated, feature visibility may be controlled such that the features become visible/available (or not) in other sessions, go live, or used in other requests. This visibility is controlled by either the retirement or promotion of the features. Thus, as features are retired, they may be eventually deleted and unavailable for use in the feature processing. Again, those modules and components used within the feature store 400 are for exemplary purposes and more or less functions, and modules may be possible.

Figure 5:
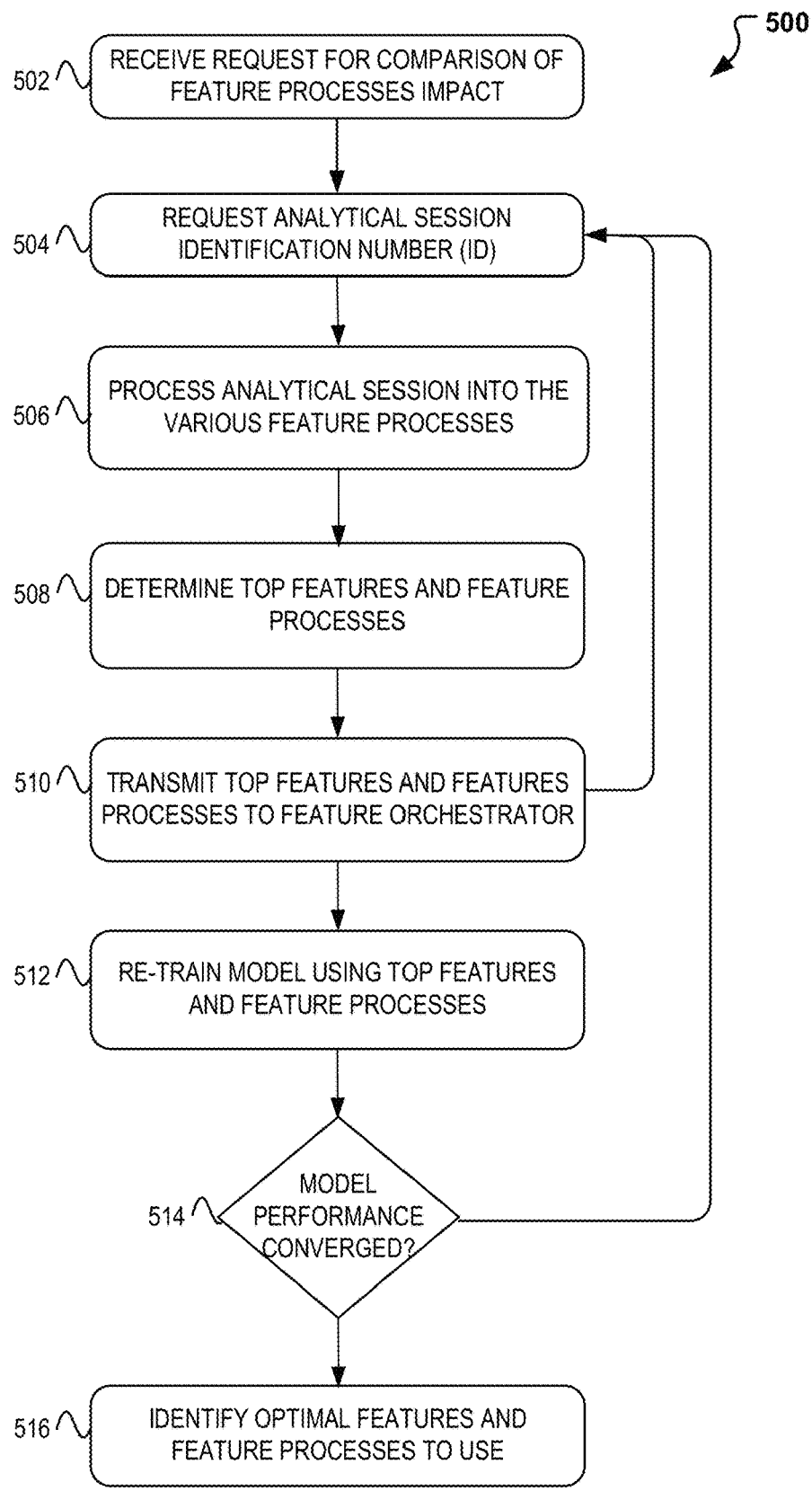
FIG. 5 illustrates a flow diagram illustrating operations for feature selection.
Figure 6:
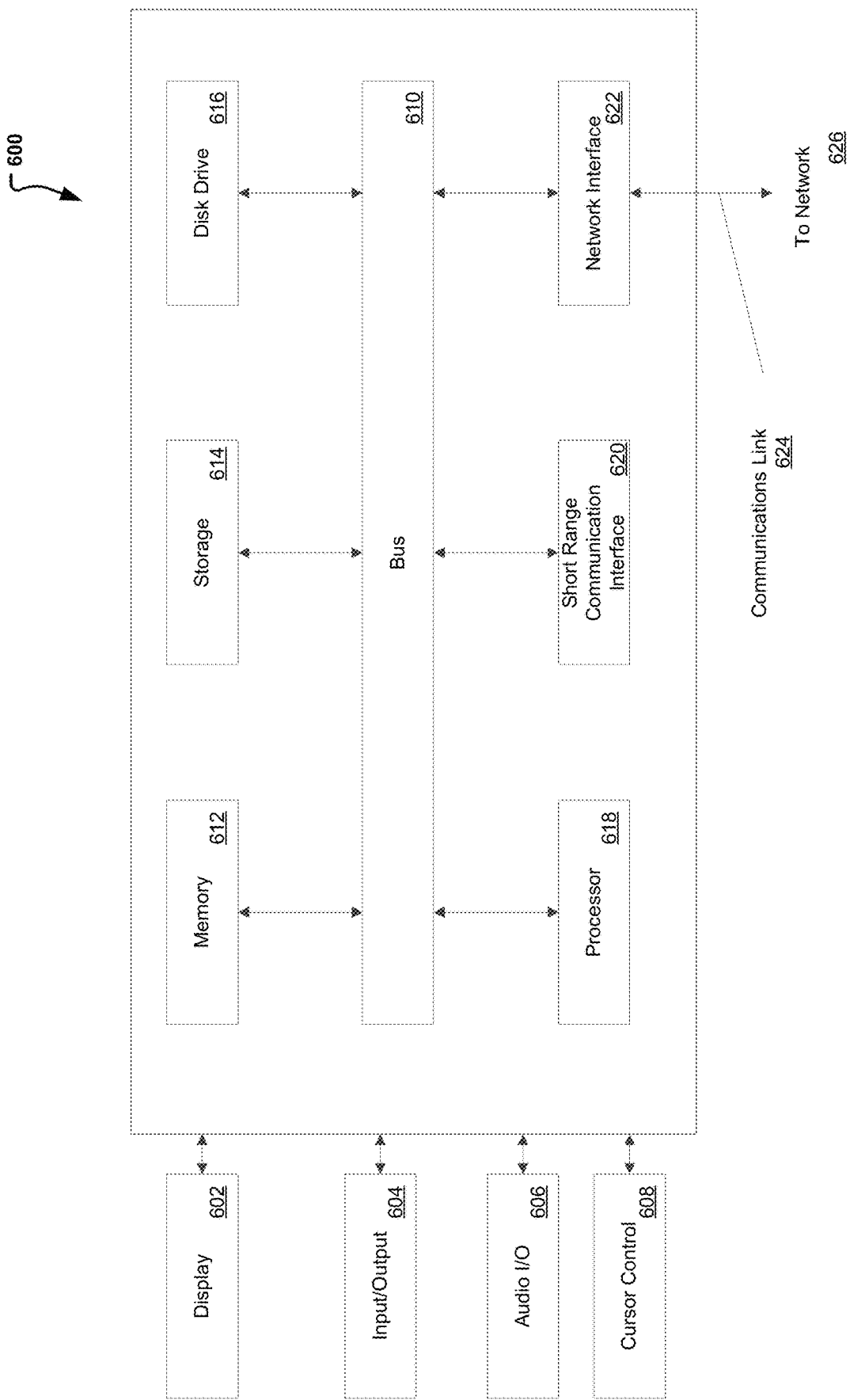
FIG. 6 illustrates an example block diagram of a computer system suitable for implementing one or more devices of the communication systems of FIGS. 1-5.

To illustrate how the auto-determining feature system may be used, FIG. 5 is introduced which illustrates an example process 500 that may be implemented on a system 600 of FIG. 6. In particular, FIG. 5 illustrates a flow diagram illustrating how the auto-determining feature system provides the ability to identify those features and feature processes that provide optimal performance for a given use case, experiment, and/or model. According to some embodiments, process 500 may include one or more of operations 502-516, which may be implemented, at least in part, in the form of executable code stored on a non-transitory, tangible, machine readable media that, when run on one or more hardware processors, may cause a system to perform one or more of the operations 502-516.

Process 500 may begin with operation 502, where a request for performing a job or experiment by the auto-determining feature system is received. The request received may be received from a device or other user device designed to communicate with the auto-determining feature system. At the device an application, dashboard, website, link, user interface (UI), or the like may be used for the request. In one embodiment, the request may include the evaluation of feature processes as identified or suggested at the request. for a face identification is received. In another embodiment, the request may include the identification of optimal features for a given model. Still in other embodiments, the request may include a determination of a current job status. The requests may be received by a feature orchestrator which as previously described routes and manages the incoming requests. The feature orchestrator may also communicate with other modules or components within the auto-determining system such as a feature store and feature consumer for executing the job requests received.

For example, as the request is received, the process 500 continues to operation 504 where the feature orchestrator may communicate with the feature store to obtain an analytical session ID. The feature store may then determine and provide the analytical session numbers to the feature orchestrator for use by the feature consumer. In addition, at the feature store, the corresponding feature processes and data may be retrieved and used for the evaluation. Thus, at operation 506, the analytical sessions or jobs begin processing including the use of the feature store for managing the session and providing a data store until for use in accessing the data/feature processes by the feature consumer. In addition, the feature consumer may be used for accessing other data associated with the analytics involved and then link the feature dimension with the other data for training and accessing the labels used in the model(s).

Process 500 then continues to operation 508 where the optimal feature and feature processes are determined. This analysis may occur at the feature training system based on the data provided by the feature consumer and labels/models accessed. Thus, the training system can therefore be use this in conjunction with labels and models to determine which of the features input are the optimal. The identification of the optimal features may be sent to the feature orchestrator for use and making recommendations as other feature process request are received. To identify the top features to use a feature selection score may be determined and used.

At operation 510, once the top or best performing features and corresponding feature processes have been identified, the results may be feedback to the feature orchestrator. The feature orchestrator may then use these results to resurface the best performing features such that next time another job is requested, the features are available in the re-processing at the request of an analytical session and corresponding analytical session identification number at operation 504. Additionally, process 500 also continues to operation 512 where the best features identified are used by the training system for re-training. The process, resurfacing, and the use of the features in the current and upcoming jobs continue within the auto-determining feature system until the model performance converges at operation 514. If the performance converges, then the optimal features and features processes have been identified at operation 516. Notice that the optimal features may be determined for a model as similar analytical sessions (jobs/experiments) are run. That is to say, the (top) features become optimal for a feature process evolution of a same type. Alternatively, the process continues to operation 514 and best features continue to be presented during the job requests. However, as the process continues to operation 516, the optimal features identified may be promoted and as may be determined those which did not may also be demoted or retired and removed over time. Thus, those features retired may ultimately be deleted and/or not visibly available for selection during the request for evaluation process 500.

Note that these operations are presented as exemplary processed and more or less operations may be involved in the process. In addition, the order of the operations and iteration of the features may occur during other operations and in some instances in parallel while the current process is taking place.

FIG. 6 illustrates an example computer system 600 in block diagram format suitable for implementing on one or more devices of the system in FIGS. 1-5 and in particular verification system 200. In various implementations, a device that includes computer system 600 may comprise a personal computing device (e.g., a smart or mobile device, a computing tablet, a personal computer, laptop, wearable device, PDA, etc.) that can communicate with a network 626. A service provider and/or a content provider may utilize a network computing device (e.g., a network server) capable of communicating with the network. It should be appreciated that each of the devices utilized by users, service providers, and content providers may be implemented as computer system 600 in a manner as follows.

Additionally, as more and more devices become communication capable, such as new smart devices using wireless communication to report, track, message, relay information and so forth, these devices may be part of computer system 600. For example, windows, walls, and other objects may double as touch screen devices for users to interact with. Such devices may be incorporated with the systems discussed herein.

Computer system 600 may include a bus 610 or other communication mechanisms for communicating information data, signals, and information between various components of computer system 600. Components include an input/output (I/O) component 604 that processes a user action, such as selecting keys from a keypad/keyboard, selecting one or more buttons, links, actuatable elements, etc., and sending a corresponding signal to bus 610. I/O component 604 may also include an output component, such as a display 602 and a cursor control 608 (such as a keyboard, keypad, mouse, touchscreen, etc.). In some examples, I/O component 604 other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 618, which may be a micro-controller, digital signal processor (DSP), or other processing component, that processes these various signals, such as for display on computer system 600 or transmission to other devices over a network 626 via a communication link 624. Again, communication link 624 may be a wireless communication in some embodiments. Processor 618 may also control transmission of information, such as cookies, IP addresses, images, and/or the like to other devices.

Components of computer system 600 also include a system memory component 614 (e.g., RAM), a static storage component 614 (e.g., ROM), and/or a disk drive 616. Computer system 600 performs specific operations by processor 618 and other components by executing one or more sequences of instructions contained in system memory component 612 (e.g., for engagement level determination). Logic may be encoded in a computer readable medium, which may refer to any medium that participates in providing instructions to processor 618 for execution. Such a medium may take many forms, including but not limited to, non-volatile media, volatile media, and/or transmission media. In various implementations, non-volatile media includes optical or magnetic disks, volatile media includes dynamic memory such as system memory component 612, and transmission media includes coaxial cables, copper wire, and fiber optics, including wires that comprise bus 610. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 600 may also include a short-range communications interface 520. Short range communications interface 620, in various embodiments, may include transceiver circuitry, an antenna, and/or waveguide. Short range communications interface 620 may use one or more short-range wireless communication technologies, protocols, and/or standards (e.g., Wi-Fi, Bluetooth®, Bluetooth Low Energy (BLE), infrared, NFC, etc.).

Short range communications interface 620, in various embodiments, may be configured to detect other devices (e.g., device 102, secondary user device 104, etc.) with short range communications technology near computer system 600. Short range communications interface 620 may create a communication area for detecting other devices with short range communication capabilities. When other devices with short range communications capabilities are placed in the communication area of short-range communications interface 620, short range communications interface 620 may detect the other devices and exchange data with the other devices. Short range communications interface 620 may receive identifier data packets from the other devices when in sufficiently proximity. The identifier data packets may include one or more identifiers, which may be operating system registry entries, cookies associated with an application, identifiers associated with hardware of the other device, and/or various other appropriate identifiers.

In some embodiments, short range communications interface 620 may identify a local area network using a short-range communications protocol, such as WiFi, and join the local area network. In some examples, computer system 600 may discover and/or communicate with other devices that are a part of the local area network using short range communications interface 620. In some embodiments, short range communications interface 620 may further exchange data and information with the other devices that are communicatively coupled with short range communications interface 620.

In various embodiments of the present disclosure, execution of instruction sequences to practice the present disclosure may be performed by computer system 600. In various other embodiments of the present disclosure, a plurality of computer systems 600 coupled by communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 624 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on the user and user device, however, a customer, a merchant, a service or payment provider may otherwise presented with tailored information. Thus, "user" as used herein can also include charities, individuals, and any other entity or person receiving information. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory storing instructions; and
a processor configured to execute instructions to cause the system to:
receiving, via a wireless network communication, a request for a first feature process evaluation at a feature orchestrator;
determining, by an analytical session manager, a plurality of feature processes and data associated with the feature process evaluation request;
determining, a first set of features for a machine learning model, based in part on a training using the plurality of processes and data determined;
processing, a second feature process evaluation using at least some of the first set of features associated with the first feature process; and
determining, a plurality of optimal features for the first and second feature process evaluations.

2. The system of claim 1, executing instructions further causes the system to:
associating the first set of features determined with the second feature process evaluation based in part on an evaluation type.

3. The system of claim 1, executing instructions further causes the system to:
associating, by a feature store module, an analytical session identification number with the feature process evaluation, wherein the determining of the plurality of processes and data is associated to the analytical session identification number.

4. The system of claim 3, wherein the analytical session identification number is determined by the feature orchestrator.

5. The system of claim 1, wherein the features with a higher feature score are promoted by a feature store module for use with the second feature process evaluation.

6. The system of claim 5, wherein the analytical session identification number isolates the first feature process evaluation from another feature process evaluation.

7. The system of claim 6, wherein the first feature process evaluation and the another feature process evaluation run in parallel.

8. A method comprising:
in response to receipt of a request to run an analytical session for feature process evaluation, determining an analytical session identification number;
transmitting the analytical session number to a feature store module and consumer module;
determining and retrieving corresponding features and feature processes based in part on the feature process evaluation requested by the feature store module;
transmitting, by the consumer module, the corresponding features and feature processes to a training module;
determining top features and feature processes by the training module; and
promoting the top features and feature processes to a feature orchestrator.

9. The method of claim 8, further comprising:
routing, by the feature orchestrator, a request to the feature store module to determine the analytical session identification number.

10. The method of claim 8, wherein the feature orchestrator associates the promoted features and feature processes with a type of feature process evaluation, and the feature orchestrator uses the promoted features and feature processes in another feature process evaluation of a same type.

11. The method of claim 8, further comprising:
retiring, the features and feature processes not determined to be top feature and feature processes in the feature process evaluation.

12. The method of claim 8, wherein the training module uses labels and modules associated with feature process evaluation.

13. The method of claim 8, wherein the feature orchestrator includes a ranking engine used for determining the top features.

14. The method of claim 8, wherein the promoting occurs by a feature registry located within the feature store module.

15. The method of claim 8, further comprising:
determining the top features are optimal features when a machine learning model converges.

16. A non-transitory machine-readable medium having stored thereon machine-readable instructions executable to cause a machine to perform operations comprising:
receiving a request for a first feature process evaluation at a feature orchestrator;
determining a plurality of feature processes and data associated with the feature process evaluation request;
determining a first set of features for a machine learning model, based in part on a training using the plurality of processes and data determined;
processing a second feature process evaluation using at least some of the first set of features associated with the first feature process; and
determining a plurality of optimal features for the first and second feature process evaluations.

17. The non-transitory medium of claim 16, further comprising:
associating the first set of features determined with the second feature process evaluation based in part on an evaluation type.

18. The non-transitory medium of claim 16, further comprising:
associating, by a feature store module, an analytical session identification number with the feature process evaluation, wherein the determining of the plurality of processes and data is associated to the analytical session identification number.

19. The non-transitory medium of claim 16, wherein the analytical session identification number is determined by the feature orchestrator.

20. The non-transitory medium of claim 16, wherein the features with a higher feature score are promoted by a feature store module for use with the second feature process evaluation.

* * * * *